J. COCHRANE.
Car Truck.
No. 12,358.
Patented Feb. 6, 1855.
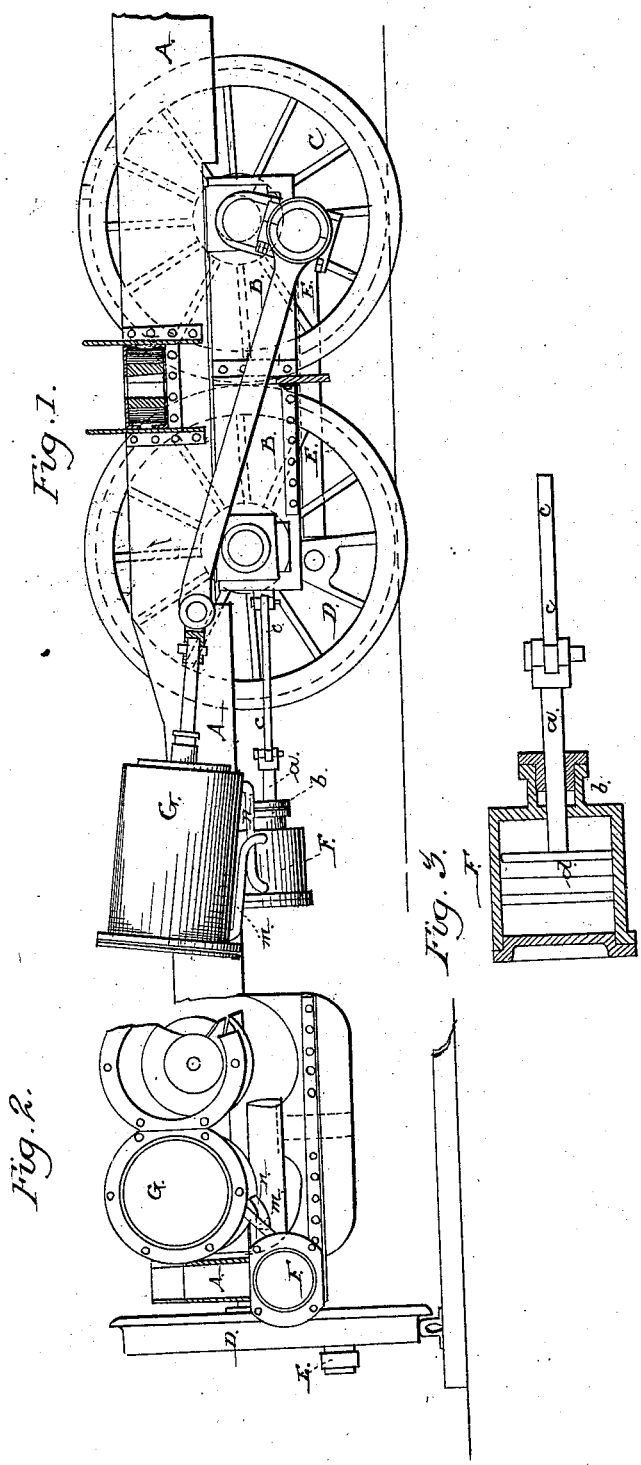

UNITED STATES PATENT OFFICE.

JOHN COCHRANE, OF BALTIMORE, MARYLAND.

LOCOMOTIVE-TRUCK.

Specification of Letters Patent No. 12,358, dated February 6, 1855.

*To all whom it may concern:*

Be it known that I, JOHN COCHRANE, of the city of Baltimore and State of Maryland, civil engineer, have invented a new and useful Apparatus, which I style "The Steam or Hydraulic Brace," for the purpose of preventing the vibratory tendency of the trucks of locomotive steam engines, when the wheels of such trucks are operated as driving wheels by the direct action of engines the cylinders of which are attached to the main frame of the locomotive; and I do hereby declare that the following is a full and exact description thereof, reference being had to the accompanying drawings and to the letters of reference marked thereon.

To enable others skilled in the art to make and use my invention, I will proceed to describe its construction and operation.

Figure 1 is an inside elevation of a portion of a locomotive and truck, and Fig. 2, is a front elevation of the same parts, and the same letters are used to designate the same parts in both drawings.

In Fig. 1, A A is part of the main frame of the locomotive and B B the truck frame, which is attached to the main frame by means of a center pin in the usual manner, and C and D are the wheels, which are made to operate as driving wheels by means of a pair of inside connected engines working together on the cranked axle of the wheels C, from which wheels power is transmitted to the front wheels D by means of side connecting rods E E, thus the wheels of the truck are made to operate as driving wheels; and the same thing may be done by means of a pair of outside connected engines working on crank pins in the wheels and having their cylinders attached to the main frame of the locomotive; but in either case, the cylinders being attached to the main frame, and the power applied directly to the truck wheels, the direct action of the forces working alternately in opposite directions will cause the truck frame to vibrate or jerk toward and from the cylinders; and the greater the distance that the center of the cylinder is from the center of the truck, so much the greater will be the tendency of the truck to vibration from this cause. This vibratory tendency of the truck I neutralize or prevent by means of a pair of self acting steam or hydraulic braces, which I construct and operate in the following manner, I place a cylindrical chamber F Figs. 1 and 2, immediately beneath the main frame, on each side of the locomotive, and adjacent to the steam cylinders which operate the truck driving wheels; in these chambers, pistons are fitted to work steam tight by the ordinary methods of packing, the rod *á* of which passes through the stuffing box *b* in the back end of the chamber, and connects with the truck frame B B by means of the connecting rod *c c*.

Fig. 3 is a section on a larger scale of the brace chamber F showing its piston *d* piston rod *a* and connecting rod *c c*. The piston *d* divides the brace chamber into two parts, which parts I connect, reversely, with the front and back ends of the steam cylinders which operate the truck driving wheels, by means of the two pipes *m* and *n;* the pipe *m* connects the front part of the steam cylinder G with the back part of the brace chamber F and the pipe *n* connects the back part of the steam cylinder G with the front part of the brace chamber F. From this disposition and combination of the steam cylinder G and the brace chamber F the steam will act in opposite directions on their respective pistons, and thus neutralize any vibratory tendency of the truck from the action of the truck cylinders. The area of the piston of the steam brace should be so proportioned to the area of the piston of the steam cylinder, in view of their respective distances from the center line of the truck, that their action on the truck should be about equal.

When water only is used in the brace chambers, the pistons may be much smaller in diameter than when intended for steam, for the sudden jerks of the truck on the pistons could not displace the water from the chambers unless the passages were very large, but when passing into or out of a curve the action of the truck on the pistons of the chambers is that of a pressive force, which would displace the water in the chamber. The water from the condensation of the steam in the working cylinders draining into the brace chambers affords an ample supply; and in cold weather the freezing of the hydraulic braces may be prevented by allowing a small waste cock, at each end of the chambers, to remain open, the cold water thus got rid of will be continually replaced by hot water from the steam cylinders.

In passing over the straight parts of the road, the pistons of the steam or hydraulic brace occupy a central position in the chambers, but on entering a curve, one of the pistons will move forward in its chamber and the other backward, to the extent of the angular position assumed by the truck in accommodating itself to the curve.

What I claim as my invention and desire to secure by Letters Patent is—

The method of neutralizing or preventing the vibratory tendency of the trucks of locomotive engines, caused by the direct action of the forces which operate the truck driving wheels, by means of the steam or hydraulic brace substantially as described.

JOHN COCHRANE.

Witnesses:
JAMES COCHRANE,
H. M. COCHRANE.